United States Patent [19]
Tanikoshi

[11] 3,831,073
[45] Aug. 20, 1974

[54] CONTROL SYSTEM FOR SYNCHRONOUS DRIVE OF DC MOTOR

[75] Inventor: Kinji Tanikoshi, Tokyo, Japan

[73] Assignees: Canon Kabushiki Kaisha; Canon Seiki Kabushiki Kaisha, both of Tokyo, Japan

[22] Filed: Apr. 24, 1973

[21] Appl. No.: 353,950

[30] Foreign Application Priority Data
Apr. 28, 1972  Japan.............................. 47-43051
July 11, 1972  Japan.............................. 47-69232
July 11, 1972  Japan.............................. 47-69231

[52] U.S. Cl. .............................. 318/254, 318/314
[51] Int. Cl. ............................................ H02p 5/16
[58] Field of Search ........... 318/138, 254, 318, 341, 318/345, 331

[56] References Cited
UNITED STATES PATENTS

| | | | |
|---|---|---|---|
| 3,164,769 | 1/1965 | Anderson............................ | 318/318 |
| 3,517,289 | 6/1970 | Brunner.............................. | 318/138 |
| 3,663,877 | 5/1972 | Clark.................................. | 318/138 |
| 3,691,438 | 9/1972 | Favre................................. | 318/138 |
| 3,716,769 | 2/1973 | Brunner.............................. | 318/254 |
| 3,743,902 | 7/1973 | Perkins.............................. | 318/138 |
| 3,753,067 | 8/1973 | Milligan............................. | 318/318 |

Primary Examiner—Robert K. Schaefer
Assistant Examiner—Thomas Langer
Attorney, Agent, or Firm—Fitzpatrick, Cella, Harper & Scinto

[57] ABSTRACT

A control system is disclosed for driving a DC commutator motor or brushless motor in precise synchronism with the external reference signal. A gate circuit which gives the logic output of the reference signal and the frequency signal representative of the rotational speed of the DC motor, generates ths signal for permitting the power supply to the DC motor in response to the first reference signal even when the reference and frequency signals are not alternately applied to the gate circuit, and also generates the signal for interrupting the power supply to the DC motor in response to the first frequency signal. A phase shifting circuit, which is actuated a predetermined time after the DC motor is started, delays the reference signal by a time slightly shorter than the interval of the reference signals, thereby generating the signal for interrupting the power supply to the DC motor. By the combination of the gate circuit and the phase shifting circuit the step out or beat of the DC motor may be completely prevented.

16 Claims, 25 Drawing Figures

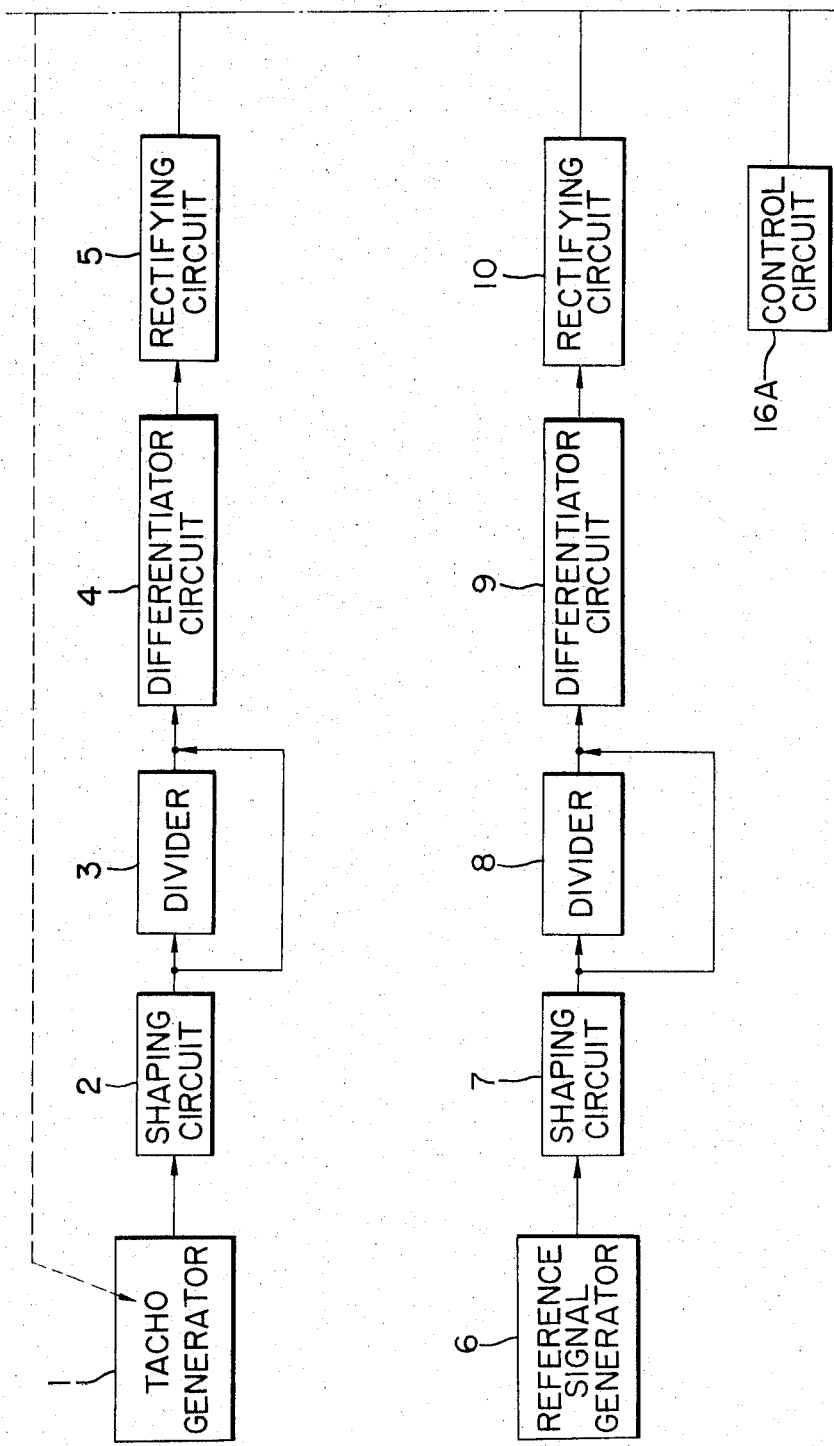

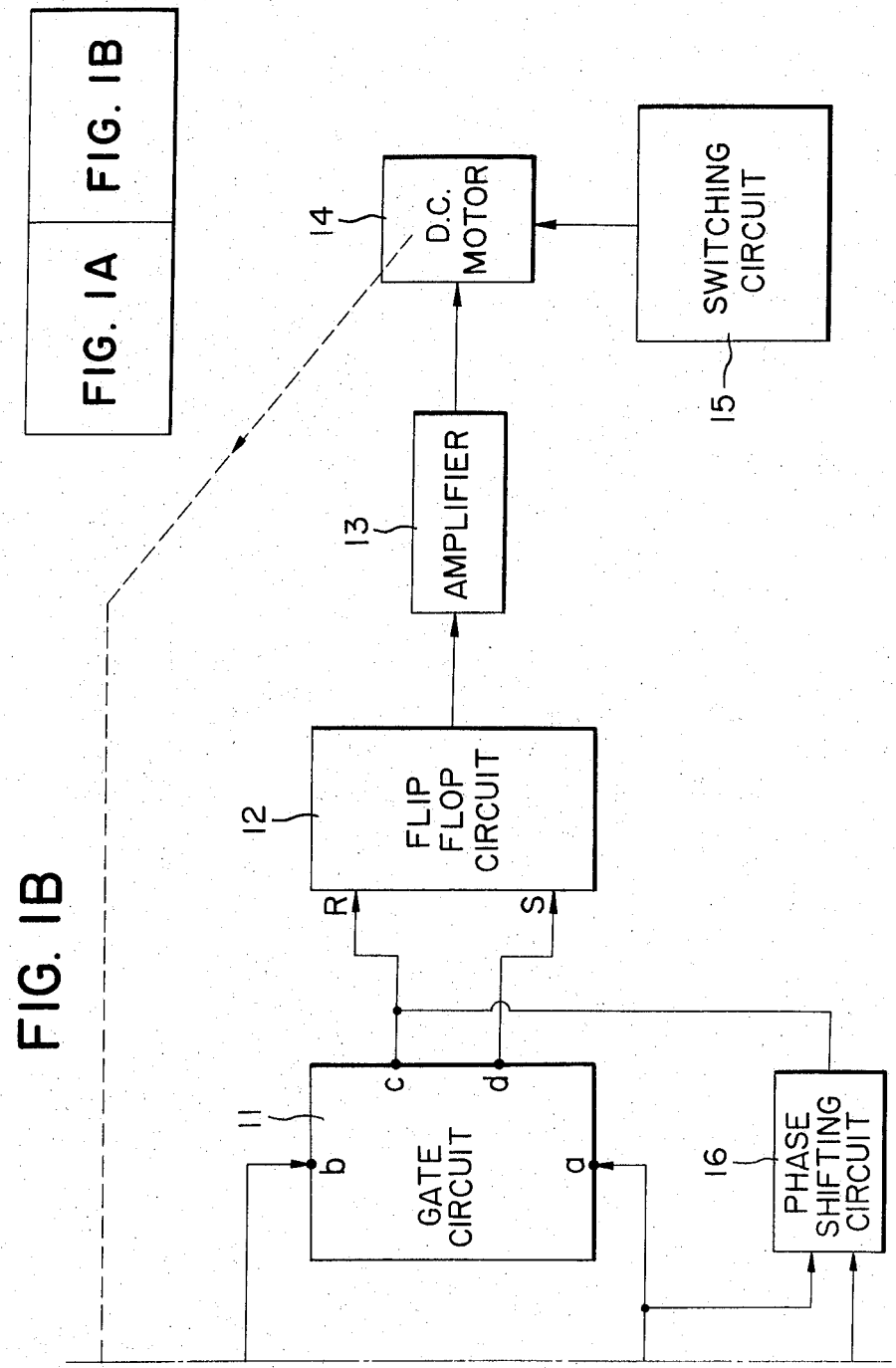

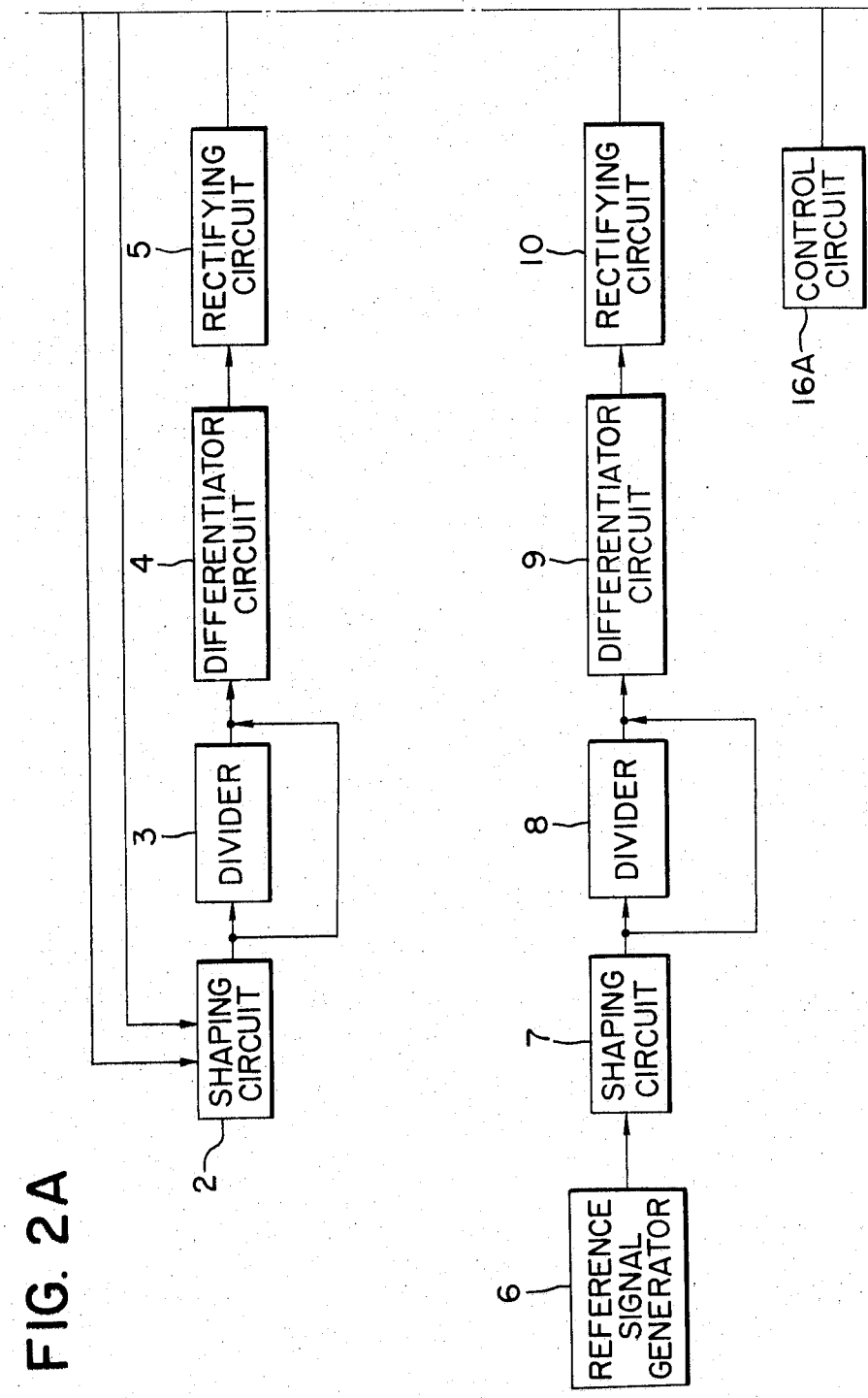

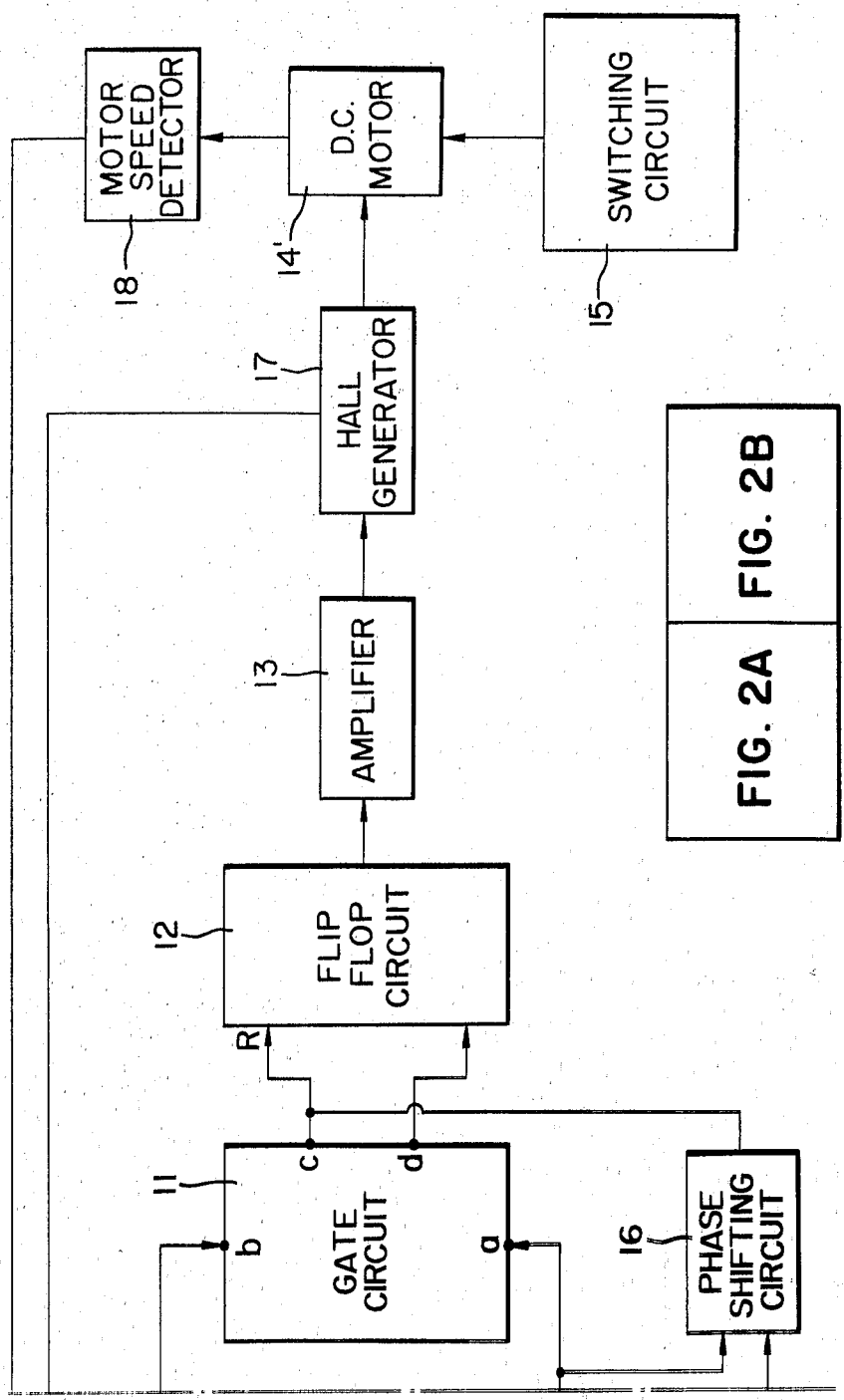

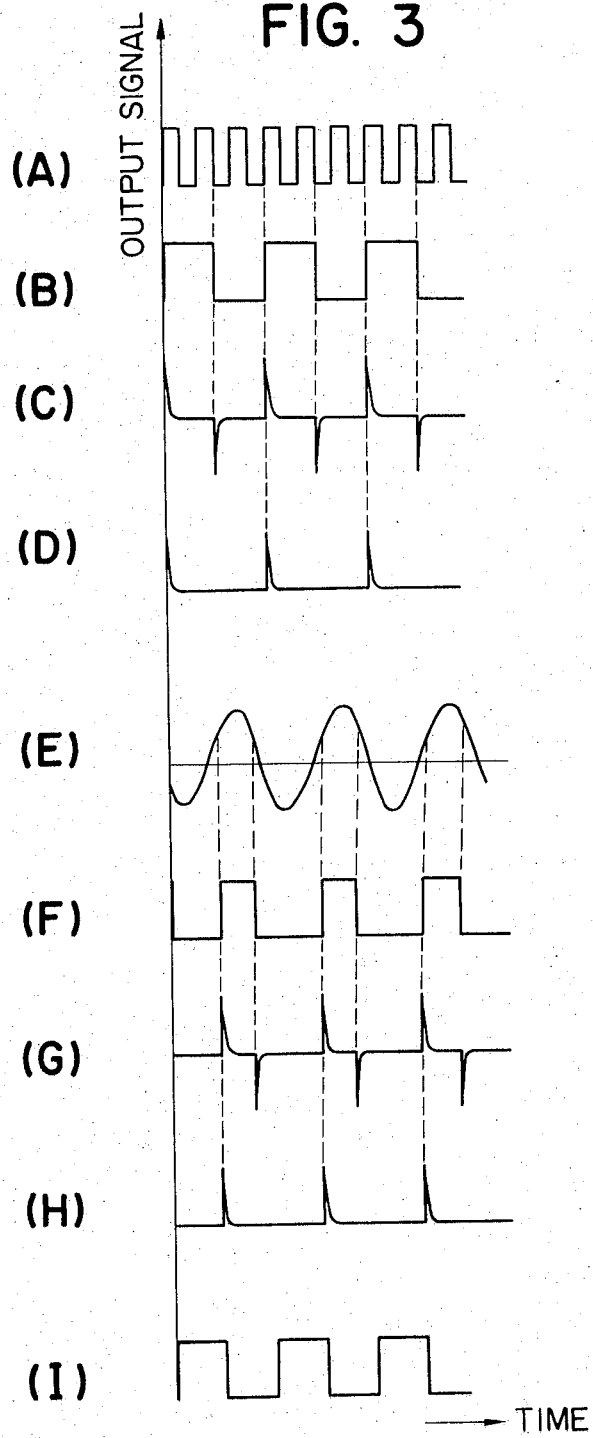

FIG. 6
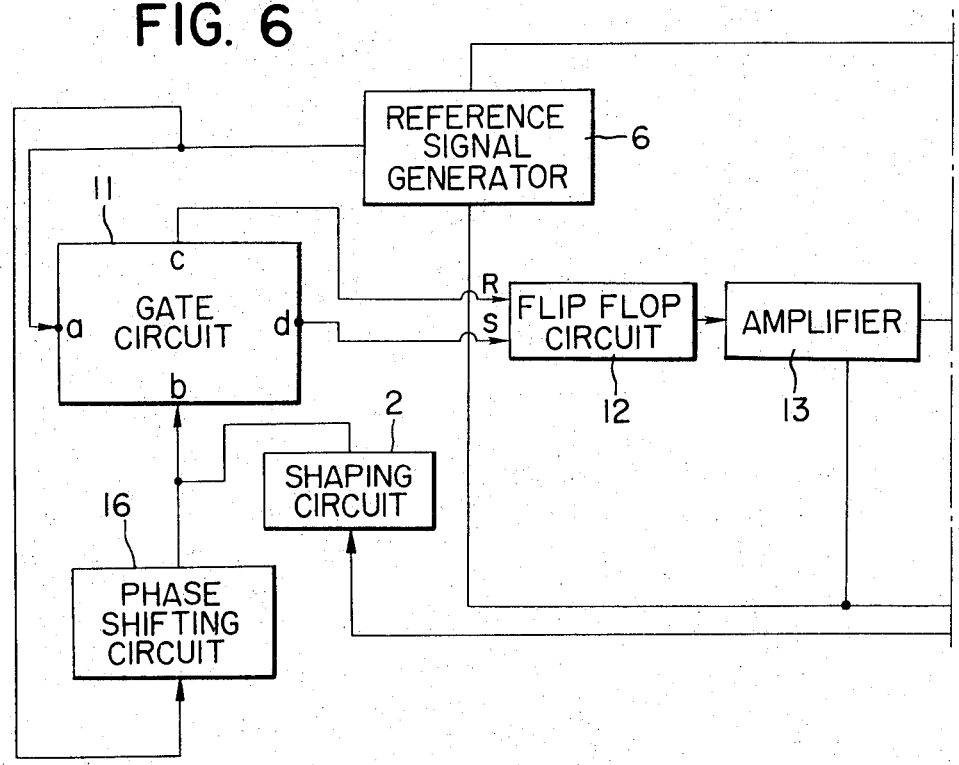
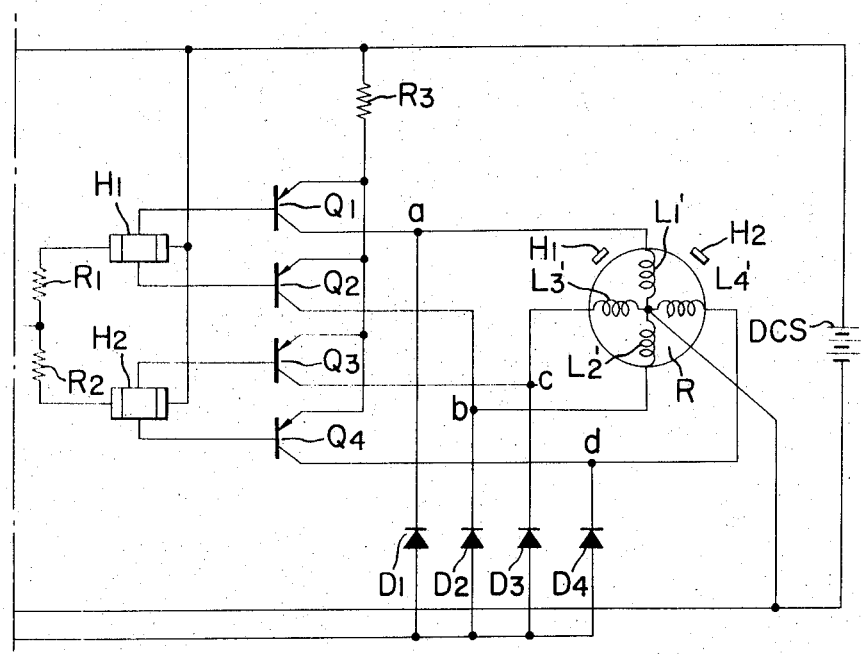

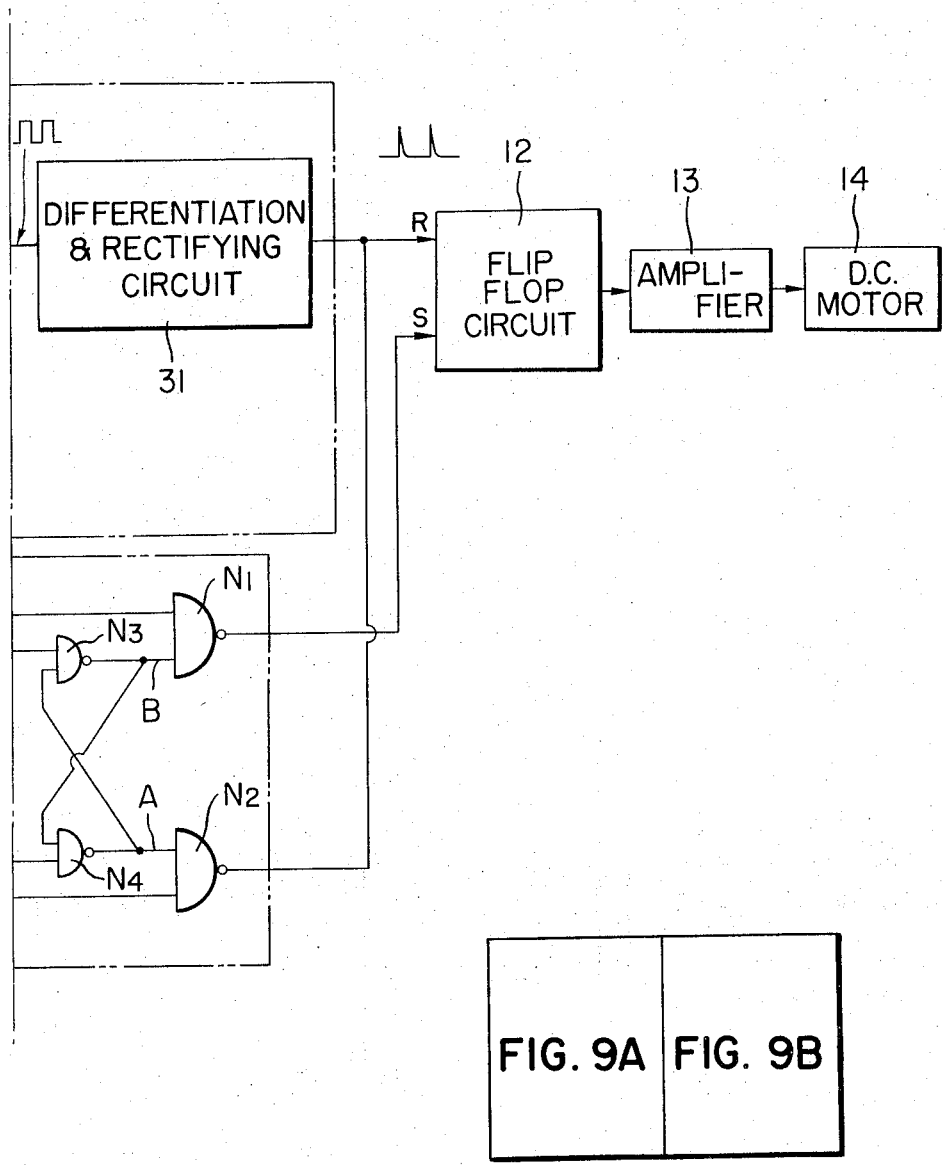

FIG. 11

(A) OUTPUT VOLTAGE OF HALL GENERATOR H1 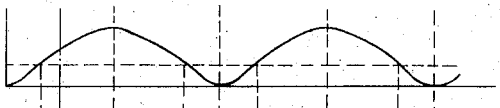

(B) OUTPUT VOLTAGE OF HALL GENERATOR H2 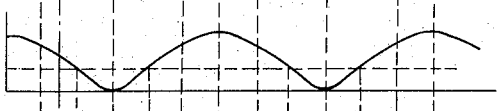

(C) CURRENT APPLIED TO COIL L11 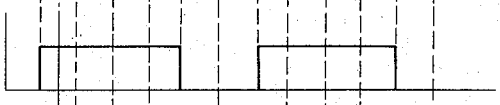

(D) CURRENT APPLIED TO COIL L12 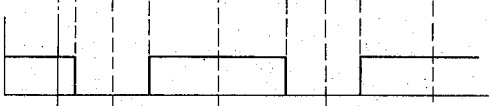

(E) EFFICIENCY OF MOTOR 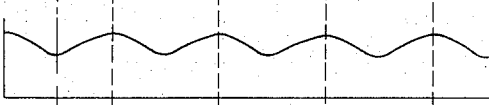

(F) PRODUCED TORQUE 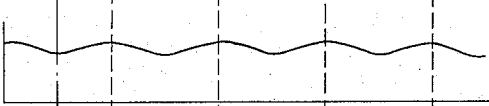

(G) MOTOR DRIVING POWER SUPPLY 

$0 \quad \frac{\pi}{4} \quad \frac{\pi}{2} \quad \pi \quad \frac{3}{2}\pi \quad 2\pi$

ROTATION ANGLE OF ROTOR (RADIAN)

FIG. 13

(A) MOTOR DRIVING POWER (B)

(C)

$0 \quad \frac{\pi}{2} \quad \pi \quad \frac{3}{2} \quad 2\pi$

→ ROTATION ANGLE OF ROTOR (RADIAN)

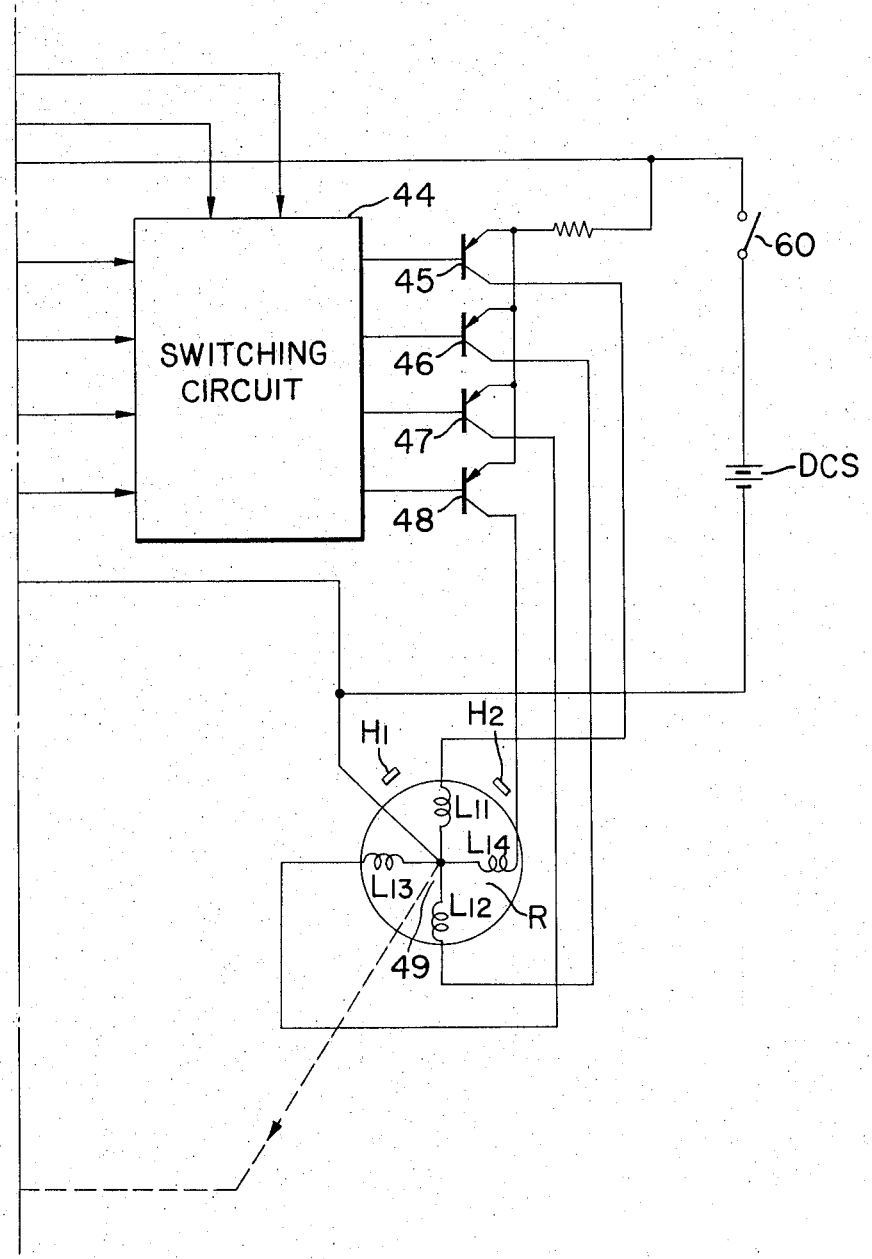
FIG. 12A"

3,831,073

CONTROL SYSTEM FOR SYNCHRONOUS DRIVE OF DC MOTOR

BACKGROUND OF THE INVENTION

1. Field of the Invention

The present invention relates to generally a control system for synchronous drive of a DC motor, and more particularly a control system for syncrhonous drive of a DC motor comprising means for generating the electrical signal representing the rotational speed of the DC motor to be controlled, means for generating the reference electrical signal representative of a predetermined reference speed of the motor, and means for generating the motor drive control signal representative of the phase difference between the electrical signal representing the rotational speed of the DC motor and the reference signal, whereby the scynchronous drive of the DC motor can be controlled in response to the control signal.

2. Description of the Prior Art

The history of the AC synchronous motors is very long, but the techniques of the DC synchronous motors are new. The DC motors are generally divided into the commutator motors of the type using a commutator and a brush assembly for distributing the power from a DC power source to the field windings of the motor, and a brushless motor of the type comprising a rotor with magnetic poles of opposite polarities, a stator with flux producing windings, and flux-sensing elements such as Hall generators so that the power from a DC power source may be switched so as to be intermittently and sequentially supplied to the flux producing windings.

There have been devised and demonstrated various system for controlling the rotational speed of the DC commutator motors, According to one prior art control system, the rotational speed of a DC commutator motor is detected and compared with the reference speed so that a speed control circuit may be actuated in response to the difference between the two signals. Such analog control system is not adapted for controlling a DC motor rotating at a hish speed because of a large drift. In the analog control system, the variation in analog quantity is generally fed back to a control circuit for controlling a DC motor to rotate at a predetermined constant speed so that the speed control with a higher degree of accuracy is extremely difficult because of the deviation from the reference speed.

There have been also devised and demonstrated in practice various control systems for DC brushless motors, but none of them is satisfactory because the step out or the so-called beat phenomenon cannot be eleminated. The step out or beat phenomena are as follows:

i. A DC brushless motor tends to rotate in synchronism with the harmonics of the reference signal before it reaches a predetermined synchronous speed. Thus the DC brushless motor will not rotate at a predetermined synchronous speed.

ii. The uniformly spaced apart current pulses to a DC brushless motor cannot be obtained even when the motor is rotating at a predetermined synchronous speed, but the frequency of the current pulses is varied periodically, thus leading to the so-called "beat" phenomenon. As a result the rotational speed is once maintained at a speed different from a predetermined speed, but is immediately varied in response to the variation in load. Therefore the rotational speed is not stable at all.

The prior art control systems for DC brushless motors have a further defect that the driving current pulses are intermittently supplied so that the wow and flatter tend to occur very often even when the motor is rotating at a predetermined synchronous speed. To overcome this problem the pulse width must be reduced as narrower as possible, but there is a limit to narrowing the pulse width.

SUMMARY OF THE INVENTION

One of the objects of the present invention is therefore to provide a control system for synchronous drive of a DC commutator or brushless motor which may overcome the above and other problems encountered in the prior art control systems.

Another object of the present invention is to provide a control system for synchronous drive of a DC commutator or brushless motor comprising logic means, to which are applied the reference signal for establishing a synchronous speed of the motor and the signal representing the rotational speed of the motor, for controlling the output signals in such a manner that the power supply to the DC motor may be intermittently started and interrupted reglardless of the input states of said two signals.

Another object of the present invention is to provide a control system for synchronous drive of a DC commutator or brushless motor of the type in which signal processing means delays the reference signal by a predetermined time to provide the signal used instead of the signal representative of the rotational speed of the DC motor when the latter is not available so that the control of the power supply to the DC motor may be effected in response to the reference signal and the delayed reference signal, thereby precisely controlling the synchronous drive of the DC motor.

Still another object of the present invention is to provide a control system for synchronous drive of a DC commutator or brushless motor driven by the pulse-shaped driving power of the type including means which controls the distribution of the driving current to the windings or coils in such a manner than when the supply of the driving power is interrupted the torque produced may become minimum, thereby improving the efficiency of the DC motor.

According to one aspect of the present invention the output of a tacho generator which detects the rotational speed of a DC motor is shaped into the pulses representing the rotational speed of the DC motor to be referred to as the "rate pulses" in this specification. Means is provided for generating the control pulse signals whose pulse width represents the difference in phase between the rate pulses and the reference pulses representative of a predetermined speed generated by reference pulse generating means. The rate pulses and the reference pulses are applied to gate circuit so that they are alternately applied to the control pulse signal generating means, and the driving power or current to the DC motor is controlled in response to the control signals so that the DC motor is driven at a predetermined synchronous speed. That is, the driving power to the DC motor is controlled in response to said two signals. More particularly in response to the reference pulses the driving power supply to the DC motor is permitted whereas in response to the rate pulses the power supply is interrupted so that the step out of the DC motor, especially the "beat" phenomenon can be eliminated.

According to another aspect of the present invention a phase shifting circuit is provided so that the reference pulse to be applied to the control pulse signal generating means as a reset signal may be delayed by a predetermined time. As a consequence even when the rate pulse is not applied to the control pulse signal generating means, the latter may be reset so that the power supply to the DC motor may be interrupted even when the generation of the rate pulse is much delayed due to the variation in load after the DC motor has attained a predetermined synchronous speed. Therefore the step out of the DC motor may be completely eliminated. However the interruption of the power supply to the DC motor is not required from the time the DC motor is started until its speed reaches a predetermined scynchronous speed. For this purpose means is provided for automatically actuating the phase shifting circuit only after the rotational speed of the DC motor reaches a predetermined synchronous speed.

The above and other objects, features and advantages of the present invention will become more apparent from the following description of some preferred embodiments thereof taken in conjunction with the accompanying drawing.

BRIEF DESCRIPTION OF THE DRAWING

FIG. 1 is a block diagram of a first embodiment of a control system for synchronous drive of a DC commutator motor in accordance with the present invention;

FIG. 2 is a block diagram of a second embodiment of a control system in accordance with the present invention adapted for controlling the synchronous drive of a brushless DC motor;

FIG. 3 shows the waveforms of the output of the components of the control system shown in FIG. 1 used for the explanation of the mode of operation thereof;

FIG. 6 is a detailed circuit diagram of the control system shown in FIG. 2;

FIG. 11 shows the waveforms used for the explanation of the mode of operation and control of the DC brushless motor shown in FIG. 10;

FIG. 13 shows the waveforms of the driving currents to the DC motor shown in FIG. 12A, the angle of rotation of the rotor being plotted along the abscissa;

DESCRIPTION OF THE PREFERRED EMBODIMENTS

Figure 4:
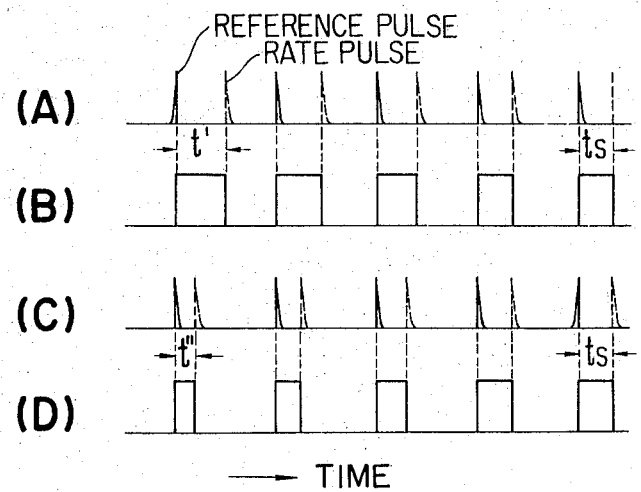
FIG. 4 shows the waveforms of the reference and rate pulses and of the driving currents when the speed of the DC motor is varied in the control systems shown in FIGS. 1 and 2.

The first embodiment of the present invention is adapted to control the synchronous drive of a DC commutator motor. Referring to FIG. 1 a tacho generator 1, a waveform shaping circuit 2, a divider 3, a differentiator circuit 4, and a rectifying circuit 5 are connected in series in the order named except the differentiator 4 whose input is also connected to the output of the waveform shaping circuit 2 by passing the divider 3. The tacho generator 1, which is motor speed detecting means, rotates at the same speed with that of a rotor of a DC commutator motor 14 and generates the AC signal whose frequency is in proportion to the rotary speed of the motor 14. The frequency divider 3 may be of any conventional type such as a shift register or counter. In like manner, a reference signal generator 6, a waveform shaping circuit 7, a divider 8, a differentiator circuit 9 and a rectifying circuit 10 are connected in series in the order named except that the input of the differentiator circuit 9 is also connected to the output of the shaping circuit 7. The reference signal generator 6 generates the reference signal for rotating the DC motor 14 at a predetermined synchronous speed.

The output signals of the rectifying circuits 5 and 10 are applied to the input terminals b and a of a gate circuit 11, respectively, whose output terminals c and d are connected to the reset and set terminals R and S of a flip-flop 12. The gate circuit 11, which will be described in more detail hereinafter, is adapted to alternately give the output signals to the flip-flop 12 in response to the signals from the tach generator 1 and the reference signal generator 6 when and only when there is a difference in time or phase between the two signals. The output of the flip-flop 12 is applied to the DC commutator motor 14 through an amplifier 13.

A switching circuit 15 coupled to the DC commutator motor 14 is adapted to stop the motor 14 when its speed is increased in excess of a predetermined speed.

The input terminal of a phase shifting circuit 16 is connected to the output terminal of the rectifying circuit 10 and the output terminal is connected to the reset terminal R of the flip-flop 12. The phase shifting circuit 16, which will be described in more detail hereinafter, is adapted to shift the phase of the reference signal transmitted from the rectifying circuit 10 in response to the signal from a control circuit 16A so that the reference signal may be delayed by a predetermined time interval. The control circuit 16A is adapted to deactivate the phase shifting circuit 16 from the time when the motor 14 is started to the time the motor 14 rotates at a predetermined synchronous speed and to activate automatically the phase shifting circuit 16 when the motor 14 starts to rotate at a predetermined synchronous speed.

Next the mode of operation of the control system described hereinbefore with reference to FIG. 1 will be explained with further reference to FIG. 3. The reference signal generator 6 generates the reference signals or pulses with a predetermined frequency as shown at (A) in FIG. 3. These pulses are applied to the frequency divider 8 after they have passed through the shaping circuit 7 so that they may be shaped into the rectangular pulse waves. The reference signals are counted down by the frequency divider 8 so that the rectangular reference signals as shown at (B) in FIG. 3 which correspond to the rotational speed of the motor 14 are applied to the differentiator circuit 9. Alternatively the output signals of the shaping circuit 7 may directly applied to the differentiator circuit 9. The output of the differentiator 9 consists of the alternate positive and negative peaks or spikes as shown in FIG. 3 at (C), the positive peak corresponding to the leading edge of the input rectangular pulse shown in FIG. 3 at (B) whereas the negative peak to the trailing edge. In the instant embodiment only the positive pulses are derived from the rectifying circuit 10 as shown at (D) in FIG. 3 and applied to the gate circuit 11.

When the DC commutatior motor 14 is started upon depression of a start button or the like, the tacho generator 1, which is coupled to the DC motor 14, generates the AC signal whose frequency corresponds to the rotational speed of the DC motor 14 as shown at (E) in FIG. 3. The AC signal is amplified, shaped into the rectangular waveform signal by the shaping circuit 2, and applied to the frequency divider 3. The frequency divider 3 gives the output signals as shown at (F) in FIG. 3 which in turn are applied to the differentiator 4. Alternatively the output signals of the shaping circuit 2 may be directly applied to the differrntiator 4. The output of the differentiator 4 consists of the alternate positive and negative peaks as shown at (G) in FIG. 3 and is applied to the rectifying circuit 5 so that the output only consisting of the positive peaks as shown in at (H) in FIG. 3 is derived, and applied to the gate circuit 11.

The gate circuit 11 controls the reference signal from the reference signal generator 6 and the rate signal from the tacho generator 1 in such a manner that they are alternately applied to the reset and set terminals R and S of the flip-flop 12. More particularly in response to the reference signal applied to the input terminal $a$, the output of the gate circuit 11 appears at the output terminal $d$ so that the flip-flop 12 may be set, but even when the next reference signal is applied to the input terminal $a$ when the phase shifting circuit 16 is deactivated, the gate circuit 11 will not give any output signal unless the rate signal is applied to the input terminal $b$ so that the flip-flop 12 remains in the set state. When the trigger signal (that is, the rate signal shown at (H) in FIG. 3) is applied to the input terminal $b$, the output of the gate circuit 11 appears at the output terminal $c$ so that the flip-flop 12 is reset. Therefore the flip-flop 12 gives the rectangular waveshape signals as shown at (I) in FIG. 3, each of which rises in response to the reference signal or trigger pulse (See FIG. 3 (D)) and falls in response to the rate signal or trigger pulse (See FIG. 3(H)). The output signals of the flip-flop 12 are applied to the DC commutator motor 14 through the amplifier 13. Since the waveform of the output of the flip-flop 12 corresponds to the waveform of the voltage applied to the DC motor 14 so that the motor 14 rotates at a speed corresponding to the conduction angle of the rectangular waveform output signals shown at (I) in FIG. 3.

FIG. 4 shows two examples of the relation among the reference signal pulse, the rate pulse from the tacho generator 1 and the motor driving current. In FIGS. 4(A) and 4(C) the reference pulses are designated by the solid lines whereas the rate pulses are designated by the broken lines, and the driving currents are shown in FIGS. 4(B) and 4(D). When the rate pulse is delayed with respect to the reference pulse as shown in at (A) in FIG. 4, the pulse width $t'$ of the driving current flowing through the windings of the motor 14 is increased so that the speed of the motor is increased until the synchronous speed is reached. Once the motor 14 rotates at a predetermined synchronous speed the pulse width remains constant, that is the pulse duration $t_s$. However when the rate pulse is advanced relative to the reference signal as shown at (C) in FIG. 4, the pulse width of the driving current is reduced as shown at $t''$ in FIG. 4(D) so that the motor speed is decreased. When the motor speed reaches a predetermined synchronous speed, the pulse duration returns to $t_s$.

When the speed of the DC motor 14 is considerably decreased due to the variation in load, the rate pulse is delayed largely relative to the reference pulse. If the gate circuit 11 were not inserted, two reference pulses would be sucessively applied to the terminal S of the flip-flop 12. To overcome this problem, the gate circuit 11 is inserted so that the reference and rate pulses may be alternately applied to the set and reset terminals of the flip-flop 12.

Figure 5:
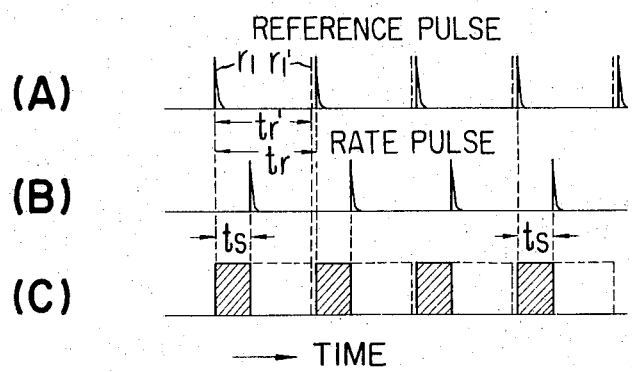
FIG. 5 is a view used for the explanation of a phase shifting circuit in the control systems shown in FIGS. 1 and 2.
Figure 15:
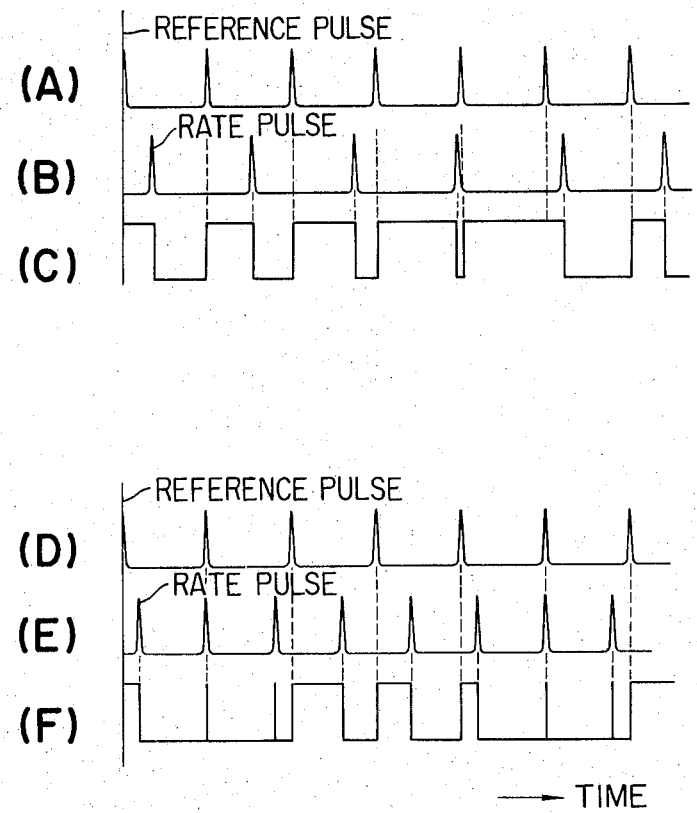
FIG. 15 shows the waveforms used for the explanation of the step out or beat phenomenon encountered in the conventional DC synchronous motors.

According to the present invention in order to prevent the step out in the synchronous drive of the DC motor, the phase shifting circuit 16 is provided so that the reference signal to be applied to the reset terminal of the flip-flop 12 may be delayed by a predetermined time interval. The mode of operation of the phase shifting circuit 16 will be described in detail hereinafter with reference to FIG. 5. FIG. 5(A) shows the relation in time between the reference pulse to be applied to the set terminal of the flip-flop 12 (solid lines) and the delayed reference pulse (broken lines) from the phase shifting circuit 16. The phase shifting circuit 16 gives the signal $r'_1$ delayed by $tr'$ relative to the first reference pulse $r_1$, and the delay time $tr'$ is so selected as to be slightly shorter than the frequency tr of the reference signals or pulses. When the DC motor 14 is rotating in synchronsim with the reference signals, the rate pulses shown in FIG. 5(B) are applied to the reset terminal of the flip-flop 12 so that the DC motor rotates at a predetermined synchronous speed in response to the rectangular waveform driving current shown in FIG. 5(C). When the rotational speed of the DC motor is reduced due to the increase in load, the pulse interval between the rate pulses is increased. For example more than two reference pulses are generated between the two rate pulses. These reference pulses are applied to the input terminal $a$ of the gate circuit 11 so that the output signals are applied to the set terminal of the flip-flop 12. As a result the flip-flop 12 remains in the set state until the reset signal is applied to the reset terminal R in response to the rate pulse. As a result the DC motor 14 is accelerated continuously. In the so-called pulse driving system in which the power supply to the motor is intermittently turned on and off, the signal for turning on the power is derived in response to the reference pulse whereas the signal for turning off the power is derived in response to the rate pulse. When a plurality of reference pulses are inserted between the rate pulses or when a plurality of rate pulses are inserted between the reference pulses, the above alternate on and off operations are not effected so that the step out or the so-called beat pnenomenon occurs. This will be described in more detail with reference to FIG. 15 illustrating the beat phenomenon by the conventional DC motor. FIG. 15(A), (B) and (C) show the case in which a plurality of reference signals are inserted between the rate pulse, whereas FIGS. 15(D), (E) and (F) show the case in which a plurality of rate pulses are inserted between the adjacent reference pulses. In either case, the pulse duration of the driving power applied to the DC motor is varied as shown in FIGS. 15(C) and 15(F). The variation in pulse width tends to be periodical so that the rotational speed of the DC motor is varied at random or is kept at a certain speed other than a predetermined synchronous speed, but the rotational speed immediately fluctuates from this speed in response to the variation in load and is not stable at all.

The phase shifting circuit 16 provided in accordance with the present invention is very effective to overcome the above problem encountered in the conventional synchronous DC motor drive systems. That is, even when the rate pulse for resetting the flip-flop 12 is not derived, the phase shifting circuit 16 applies the delayed reference signal to the flip-flop 12 thereby resetting the same. As a result the flip-flop 12 may always give the rectangular waveform output signals even when the rotational speed of the DC motor is considerably decreased. Therefore the average value may be increased and the rotational speed of the DC motor may be accelerated to a predetermined synchronous speed.

In order to reverse the direction of rotation of the DC motor 14, a transistarized circuit may be used to reverse the direction of the current flow. In order to vary the synchronous rotational speed of the DC motor the oscillation frequency of the reference generator 6 may be varied or the frequency may be varied by the frequency divider.

The second embodiment shown in block diagram in FIG. 2 is adapted to control the synchronous drive of a DC brushless motor, and is substantially similar in construction to the first embodiment shown in FIG. 1 except a Hall generator 17 and a motor-speed detector 18 are incorporated.

Figure 8:
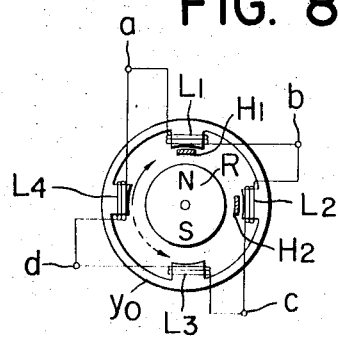
FIG. 8 is a front view of a brushless DC motor used in the embodiments shown in FIGS. 6 and 7.

As shown in FIG. 8, a DC brushless motor 14' such as a Hall element motor used in the second embodiment comprises a rotor R having a pair of magnetic poles of opposite polarities, flux-producing windings $L_1$–$L_4$ so interconnected as to form a ring connection and positioned in torque-producing relation with respect to the rotor, and a single pair of Hall generators $H_1$ and $H_2$ (shown at 17 in FIG. 2) positioned in a predetermined relation with the rotor and angularly spaced apart from each other by an angle equal to an electrical angle between the magnetic poles of 90° on the rotor and in a magnetic relation to the rotor so as to sense the magnitude of the rotor flux density as a function of angular position of the rotor. The interconnection between the stator windings $L_1$–$L_4$ is illustrated in detail in FIG. 8. Each of the windings $L_1$–$L_4$ is mounted on the yoke Yo made of a magnetic material, and the junctions $a$, $b$, $c$ and $d$ are connected to a motor driving circuit to be described in more detail hereinafter.

The motor-speed detector 18 for detecting the rotational speed of the rotor R comprises an electric circuit for detecting for example the voltage induced across the field windings, but means for detecting the voltage induced in the Hall generators may be used. The output of the Hall generator 17 or motor-speed detector 18 is applied to the shaping circuit 2. The mode of operation of the second embodiment of the present invention is substantially similar to that of the first embodiment shown in FIG. 1 except that the output of the Hall generator 17 or the motor-speed detector 18 is applied to the shaping circuit 2 instead of the output of the tacho generator 1 of the first embodiment.

FIG. 6 is a circuit diagram of the control system of the DC brushless motor, the circuits 7,8,9 and 10 shown in FIG. 2 being not shown in FIG. 6 for the sake of simplicity. Opposed to the connection of the windings $L_1$–$L_4$ shown in FIG. 8, the windings $L_1'$–$L_4'$ are connected in star connection, but the windings $L_1$–$L_4$ shown in FIG. 8 may be used when their junctions are connected to the junctions a,b,c and d shown in FIG. 6. Output transistors $Q_1$–$Q_4$ are inserted between the windings $L_1'$–$L_4'$ and a DC power source DCS in order to switch the driving current to be applied to the windings $L_1'$–$L_4'$. The bases of the output transistors $Q_1$–$Q_2$ are connected to the output terminals of the Hall generators $H_1$ and $H_2$, and one input terminal of each of the Hall generators $H_1$ and $H_2$ is connected to the positive terminal of the DC power source DCS whereas the other input terminal is connected to the amplifier 13 through a current adjusting resistor $R_1$ or $R_2$. Diodes $D_1$–$D_4$ connected to the windings $L_1'$–$L_4'$, respectively, are adapted to detect the voltage induced across the windings which are not energized in operation, thereby detecting the rotational speed of the rotor of the motor. The outputs of the diodes $D_1$–$D_4$ are applied to the shaping circuit 2 and shaped into the pulse signals to be applied to the gate circuit 11. Between the DC power source DCS and the emitters of the output transistors $Q_1$–$Q_2$ is inserted a resistor $R_3$ for protecting them.

In operation the output transistors $Q_1$–$Q_4$ in the driving circuit are sequentially turned on in response to the Hall voltages at the output terminals of the Hall generators $H_1$ and $H_2$ attached to the stator of the motor so that the brushless motor is rotated. The voltages induced across the windings $L_1'$–$L_4'$ which are de-energized are detected by the diodes $D_1$–$D_4$ and added to be applied to the shaping circuit 2. The output pulses of the shaping circuit 2 represent the rotational speed of the DC brushless motor 14' and are applied to the input terminal $b$ of the gate circuit 11. In response to the signal applied to the input terminal $b$, the gate circuit 11 gives the output signal at the output terminal $c$ so that the flip-flop 12 is reset. The frequency of the reference signal generator 6 corresponds to a predetermined synchronous speed of the motor 14' and is applied to the input terminal $a$ of the gate circuit 11 so that the output signal appears at the output terminal $d$, thereby setting the flip-flop 12. The pulse width of the rectangular waveform output pulses of the flip-flop 12 is equal to the difference in phase between the reference pulse and the rate pulse. In response to the output pulses from the flip-flop 12 the current flowing through the Hall generators $H_1$ and $H_2$ is controlled in such a manner that the input current flows through the Hall generators $H_1$ and $H_2$ during the conduction angle of the output pulses of the flip-flop 12. As a result the rotational speed of the motor 14' is controlled in response to the output pulses of the flip-flop 12.

When the rotational speed of the motor 14' is slightly slower than the frequency of the reference pulses, the rate pulses applied to the flip-flop 12 is delayed so that the pulse width of the output pulses is increased, As a consequence the rotational speed of the motor 14' is increased and returns to a predetermined synchronous speed as the phase of the rate pulses is advanced. In like manner the rotational speed of the motor in excess of a predetermined synchronous speed may be retarded to a predetermined synchronous speed. Therefore when the reference speed is set by the reference signal generator 6, the motor 14' rotates at a predetermined synchronous speed.

The phase shifting circuit 16 delays the signal from the reference signal generator 6 by a predetermined time interval and the delayed reference signal is applied to the reset terminal of the flip-flop 12 through the input and output terminals b and c of the gate circuit 11 in the manner described hereinbefore with reference to FIG. 1.

Figure 7A:
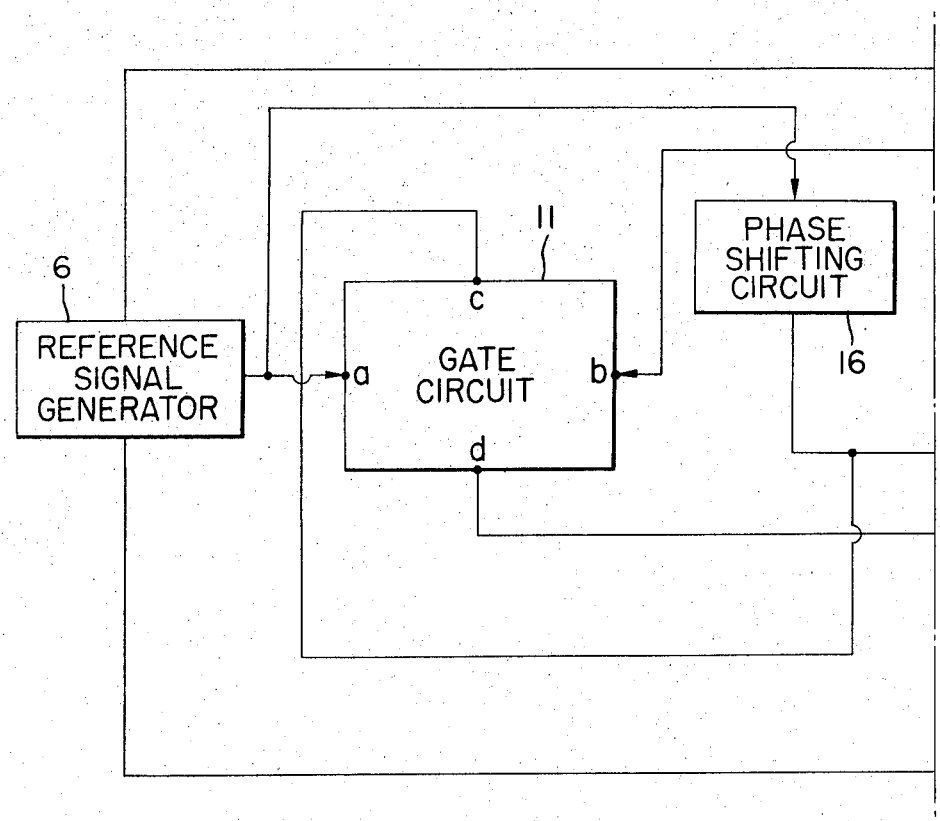
FIG. 7 is a circuit diagram of a variation of the control system shown in FIG. 6.
Figure 7B:
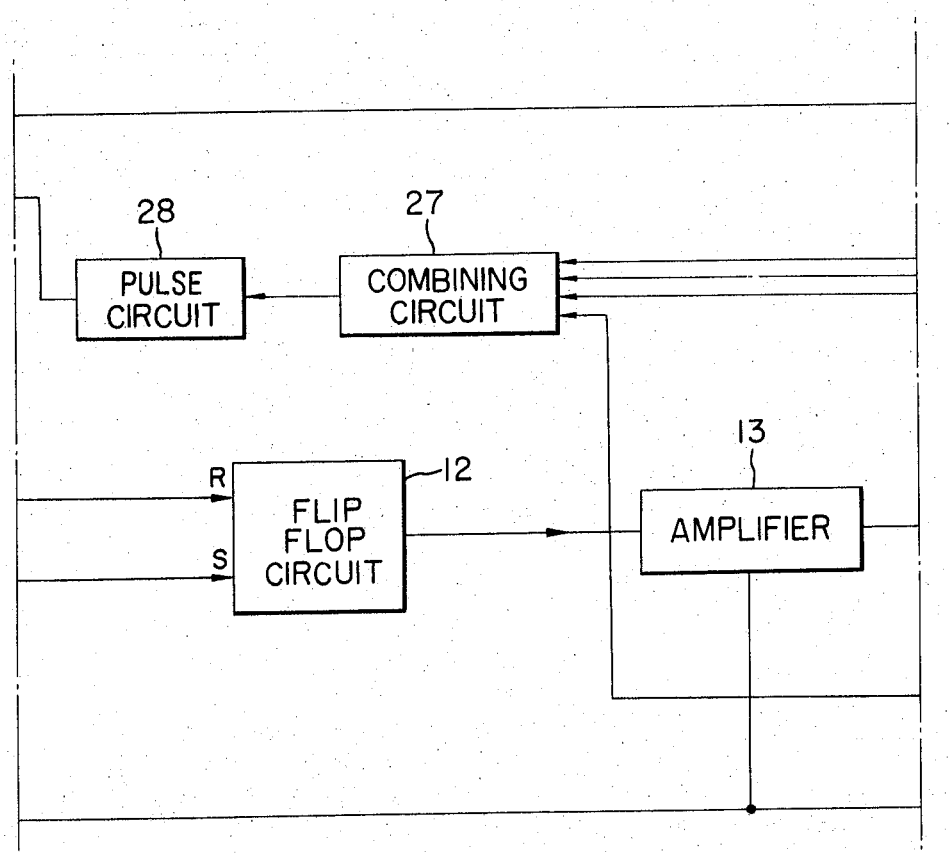
Figure 7C:
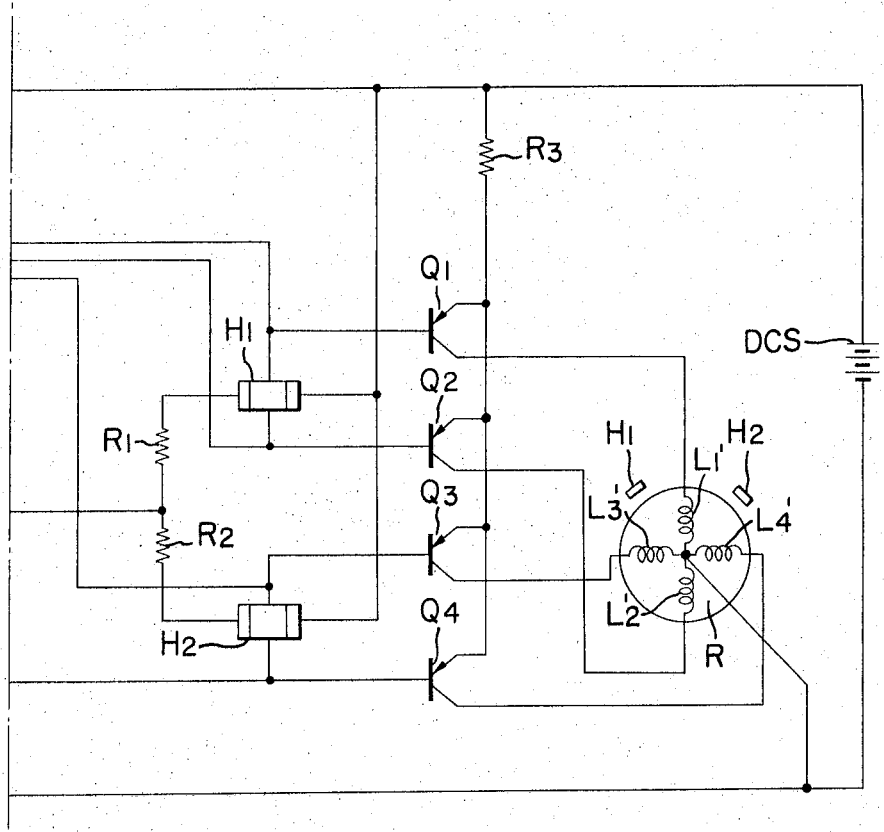

The embodiment of the present invention shown in FIG. 7 is substantially similar in construction and operation to the second embodiment described hereinbefore except that the output voltages of the Hall generators $H_1$ and $H_2$ are applied to a combining circuit 27 output of which is applied to a pulse generator 28. The output pulses of the pulse generator 28 are applied as the rate pulses to the input terminal b of the gate circuit 11. This embodiment has an advantage that when the motor 14' is started the rate pulses are obtained faster.

The gate circuit 11 will be described in detail referring to FIG. 9 which generally comprises four NAND circuits $N_1$, $N_2$, $N_3$ and $N_4$ and two R-C circuits consisting of capacitors $C_1$ and $C_2$ and $R_4$ and $R_5$ for smoothing the logic operations of the gate circuit 11. The output of the reference signal generator 6 as well as the output of the NAND circuit $N_3$ are applied to the NAND circuit $N_1$ whose logic output is applied to the set terminal of the flip-flop 12. To the NAND circuit $N_2$ are applied the output of the tacho generator 1 and the output of the NAND circuit $N_4$ whose logic output signal is applied to the reset terminal R of the flip-flop 12. One of the input terminals of the NAND circuit $N_3$ is connected through the capacitor $C_1$ to the reference signal generator 6 whereas the other input terminal is connected to the output terminal of the NAND circuit $N_4$. One of the input terminals of the NAND circuit $N_4$ is connected to the tacho generator 1 through the capacitor $C_2$ whereas the other input terminal is connected to the output terminal of the NAND circuit $N_3$.

Figure 9A:
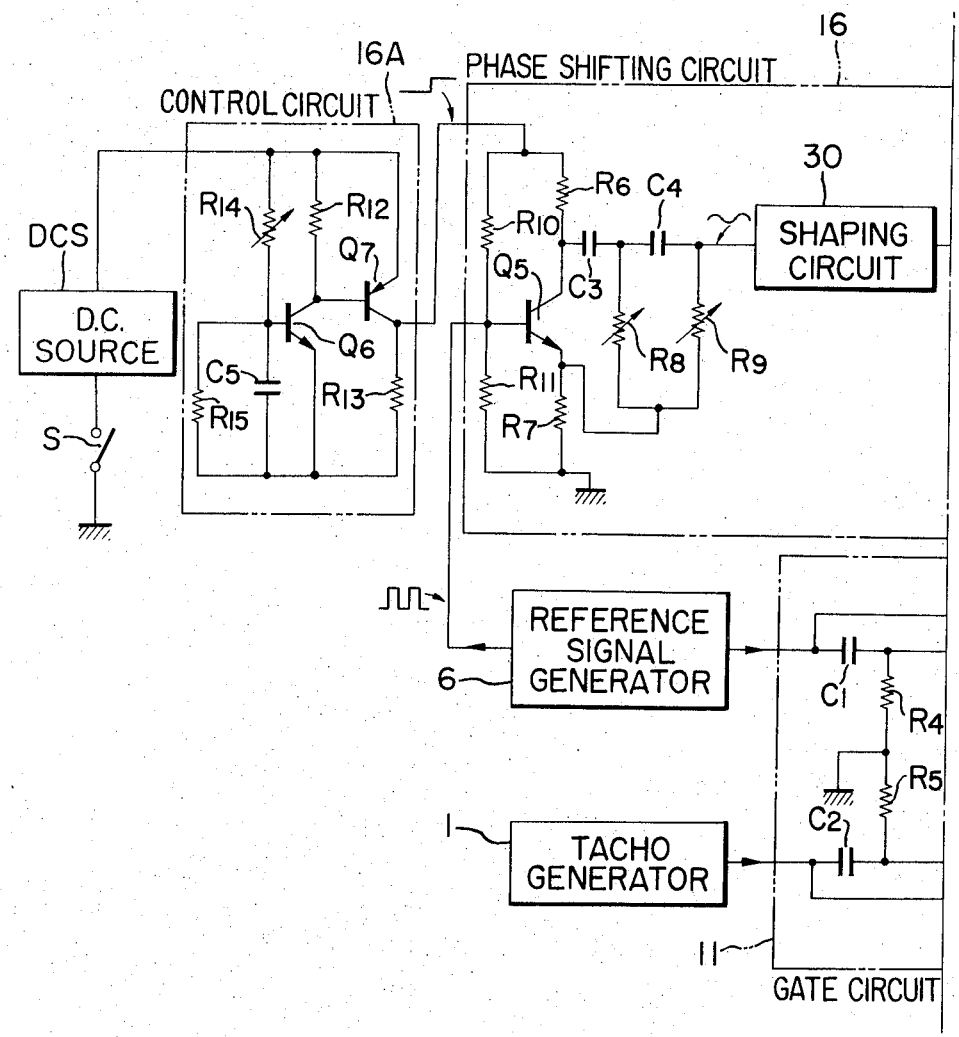
FIG. 9 is detailed circuit diagrams of the phase shifting circuit 16, a delay circuit 16A and a gate circuit 11 used in the control systems shown in FIGS. 1 and 2.

Next the mode of operation will be described breifly because the gate circuit 11 of the type shown in FIG. 9 is well known. The NAND circuits $N_3$ and $N_4$ make up a flip-flop. When the reference signal is applied to the NAND circuit $N_3$ when the output of the NAND circuit $N_4$ is "1", the output of the NAND circuit $N_3$ becomes "0" and applied to the NAND circuit $N_1$ to which is also applied the reference signal. As a result the output of the NAND circuit $N_1$ becomes "1" and is applied to the set terminal S of the flip-flop 12. When the signal from the tacho generator 1 is applied to the NAND circuit $N_4$ when the output of the NAND circuit $N_3$ is "1", the output of the NAND circuit $N_4$ becomes "0" and is applied to the NAND circuit $N_2$ to which is also applied the signal from the tacho generator 1. As a result the output of the NAND circuit $N_1$ becomes "1" and is applied to the set terminal S of the flip-flop 12. When the signal from the tacho generator 1 is applied to the NAND circuit $N_4$ when the output of the NAND circuit $N_3$ is "1", the output of the NAND circuit $N_4$ becomes "0" and is applied to the NAND circuit $N_2$ to which is also applied the signal from the tacho generator 1. As a result the output of the NAND circuit $N_2$ becomes "1" and is applied to the reset terminal R of the flip-flop 12. That is, the flip-flop comprising the NAND circuits $N_3$ and $N_4$ alternately gives the output signals to the terminals B and A of the NAND circuits $N_1$ and $N_2$.

The phase shifting circuit 16 generally comprises a switching transistor $Q_5$ and a shaping circuit 30 and a differentiator and rectifier circuit 31. The base of the switching transistor $Q_5$ is connected to the reference signal generator 6; the collector is connected through a resistor $R_6$ to the output of the control circuit 16A; and the emitter is connected through a resistor $R_7$ to the negative terminal of the DC power source DCS. The junction of parallel-connected variable resistors $R_8$ and $R_9$ is connected to the emitter of the switching transistor $Q_5$ whereas the other terminals are connected across a capacitor $C_4$. The positive terminal of the capacitor $C_4$ is connected through a capacitor $C_3$ to the collector of the switching transistor $Q_5$ whereas the negative terminal is connected to the shaping circuit 30 which in turn is connected to the differentiator and rectifier circuit 31, whose output is connected to the reset terminal R of the flip-flop 12. Resistors $R_{10}$ and $R_{11}$ are inserted for dividing the voltage.

Next the mode of operation will be described. When the reference pulse is applied to the base of the switching transistor $Q_5$, the latter is turned on, and the output thereof derived from the collector thereof if shifted in phase by two R-C circuits ($R_8$ and $C_3$ and $R_9$ and $C_4$) by a predetermined angle and is applied to the shaping circuit 30. The sinusoidal waveform output signal of the switching transistor $Q_5$ is shaped into the rectangular waveform signal by the shaping circuit 30 and is applied to the differentiator and rectifier circuit 31 so that the positive trigger pulse is applied to the reset terminal R of the flip-flop 12. The trigger pulse is delayed with respect to the reference pulse as shown in FIG. 5.

The control circuit 16A is adapted to actuate the phase shifting circuit 16 in a predetermined time after the motor 14 or 14' is started. The collector of an NPN transistor $Q_6$ is connected to the base of a PNP transistor $Q_7$ and to the DC power source DCS through a resistor $R_{12}$. The emitter of the transistor $Q_7$ is also connected to the DC power source DCS. The collector of the transistor $Q_7$ is connected to a load resistor $R_{13}$. A parallel circuit consisting of a capacitor $C_5$ and a resistor $R_{15}$ is connected through a resistor $R_{14}$ to the DC power source DCS which is turned on or off by a switch S.

Next the mode of operation will be described. When the switch S is closed the power is supplied from the power source DCS to the control circuit 16A. The difference in rise time depending upon the motor used may be adjusted by the variable resistor $R_{14}$. As the voltage across the capacitor $C_5$ is increased, the base potential of the transistor $Q_6$ is also increased so that the transistor $Q_6$ is rendered conductive. As a consequence the collector potential drops so that the transistor $Q_7$ is rendered conductive and a step-shaped output, which is delayed by a predetermined time after the switch S is closed, is derived from the collector and is applied to the phase shifting circuit 16, whereby the latter is actuated.

Another embodiment is also adapted to control the synchronous drive of a DC brushless motor of the type described with reference to FIG. 2.

In the conventional speed control systems for brushless motors, when the pulse width of the driving current pulses is varied, the trailing edge of the pulse or off-state may occur at any arbitarily phase angle so that in some cases the trailing edge or off state coincides with the maximum torque position. As a result the loss of torque is increased in the off state, resulting in the decrease in the efficiency of a motor. To overcome this problem the present invention provides a system for controlling the synchronous drive of a motor so that the minimum torque position may always coincide in phase with the center or midpoint of the off state (that is, an interval between the two adjacent pulses), thereby preventing the decrease of the efficiency of the motor.

Figure 10:
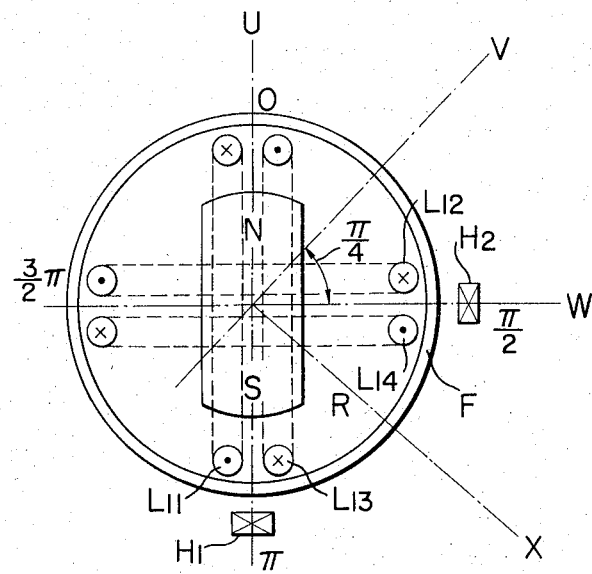
FIG. 10 is a front view of a variation of a DC brushless motor shown in FIG. 8.

First referring th FIG. 10 illustrating a brushless motor in accordance with the present invention, a rotor R made of a permanent magnet has poles N and S, and field windings $L_{11}$ and $L_{13}$ are mounted on a stator F at right angles to windings $L_{12}$ and $L_{14}$. The Hall generators $H_1$ and $H_2$ which are angularly spaced apart from each other by 90° are adapted to detect the angular position of the rotor R, and the maximum output voltage is induced in the Hall generator $H_1$ or $H_2$ which is in opposed relation with the pole of the rotor R. The output voltages of the Hall generators $H_1$ and $H_2$ change as shown in FIGS. 11(A) and 11(B), and are used to control a transistor switching circuit so that the driving currents may intermittently flow through the windings $L_{11}$ and $L_{12}$ as shown in FIGS. 11(C) and 11(D) to drive the rotor in a predetermined direction.

As shown in FIGS. 11(C) and 11(D) the rectangular waveform driving currents must be somewhat overlapped at the leading and trailing edges. Otherwise the dead band is produced in the supply of the driving current so that the motor cannot be started from the dead band. However, when the driving currents are overlapped, the rate of power utilization or efficiency of the motor is decreased as shown in FIG. 11(E). That is, the minimum efficiency of the motor occurs at the angles of rotation of the rotor R of $\pi/4$ and integral multiples thereof. The torque of the rotor R must be constant, but in practice it changes because of the non-linear properties of the Hall generators and the transistors used in the switching and driving circuits. That is, when the rotor R is in the positions indicated by U and W in FIG. 10, the maximum torque is produced, whereas the minimum torque is produced when the rotor R is in the positions indicated by V and X. The change in torque is shown in FIG. 11(F).

The DC motor control system in accordance with the present invention is of the so-called pulse control type in which the rectangular waveform driving currents are intermittently supplied to control the rotation of the motor so that it is preferred to coincide the off state of the driving current with the minimum efficiency or torque position as shown in FIG. 11(G). That is, in the fourth embodiment of the present invention, the center or midpoint of the off state of the current pulse is made coincidence with the minimum torque phase or position as shown in FIGS. 11(F) and (G) so that the driving current may always flow at the maximum torque positions, thereby improving the efficiency of the motor.

Figure 12B:
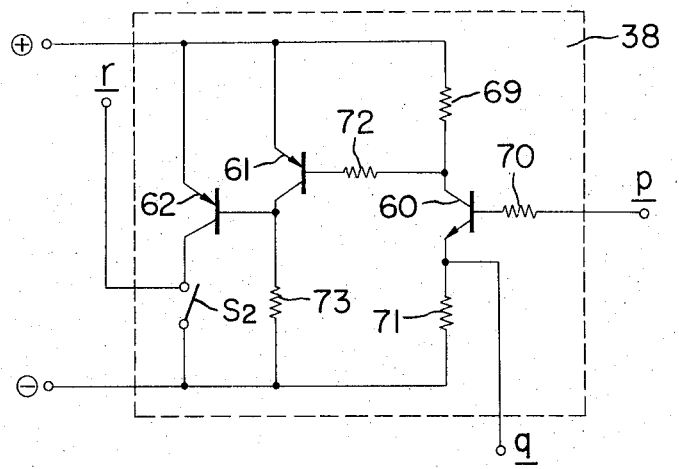
FIG. 12B is a detailed circuit diagram of a comparator 38 used in the control system shown in FIG. 12A.
Figure 12A:
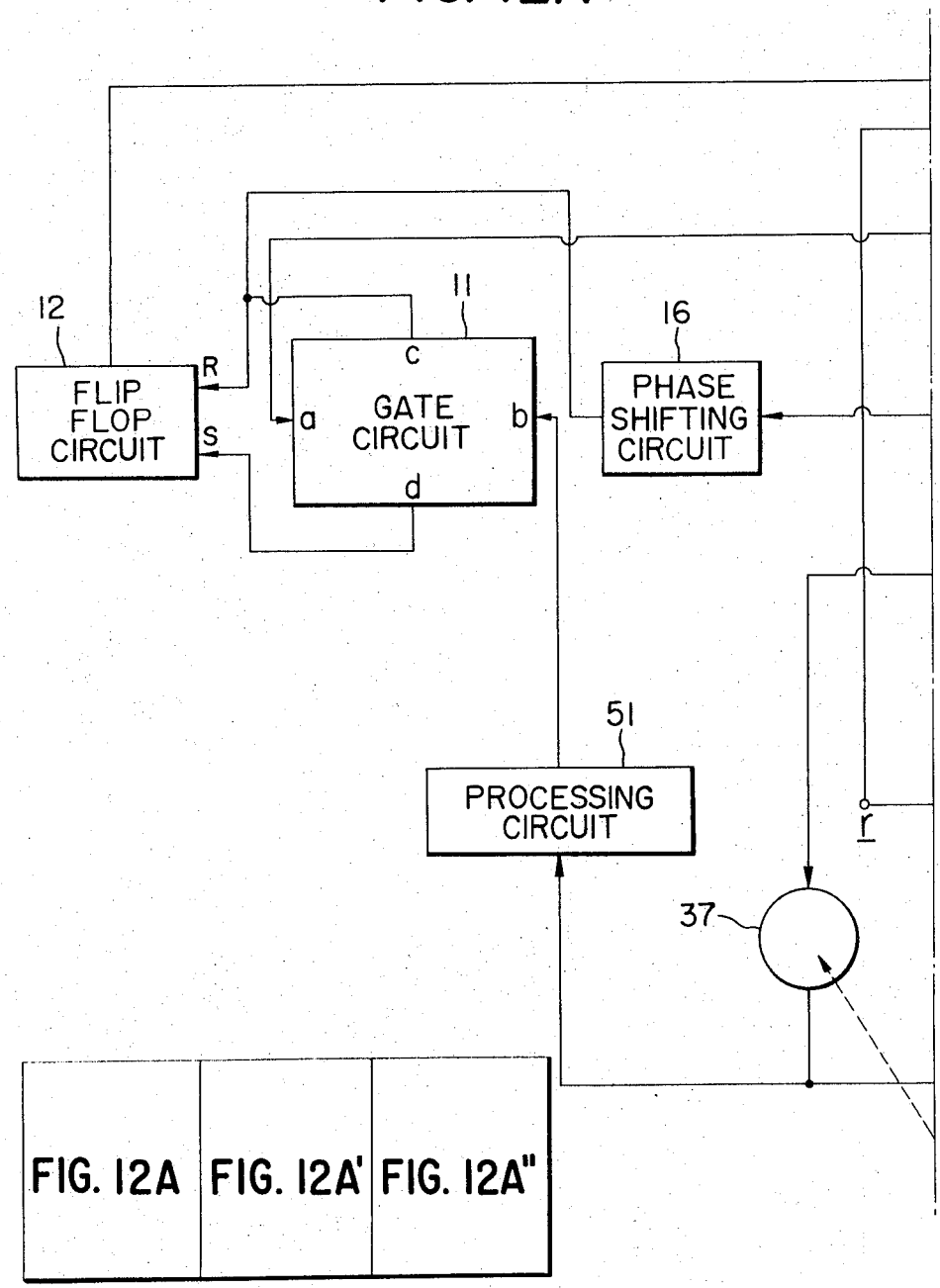
FIG. 12A is a block diagram of a another embodiment of the control system in accordance with the present invention.
Figure 12A:
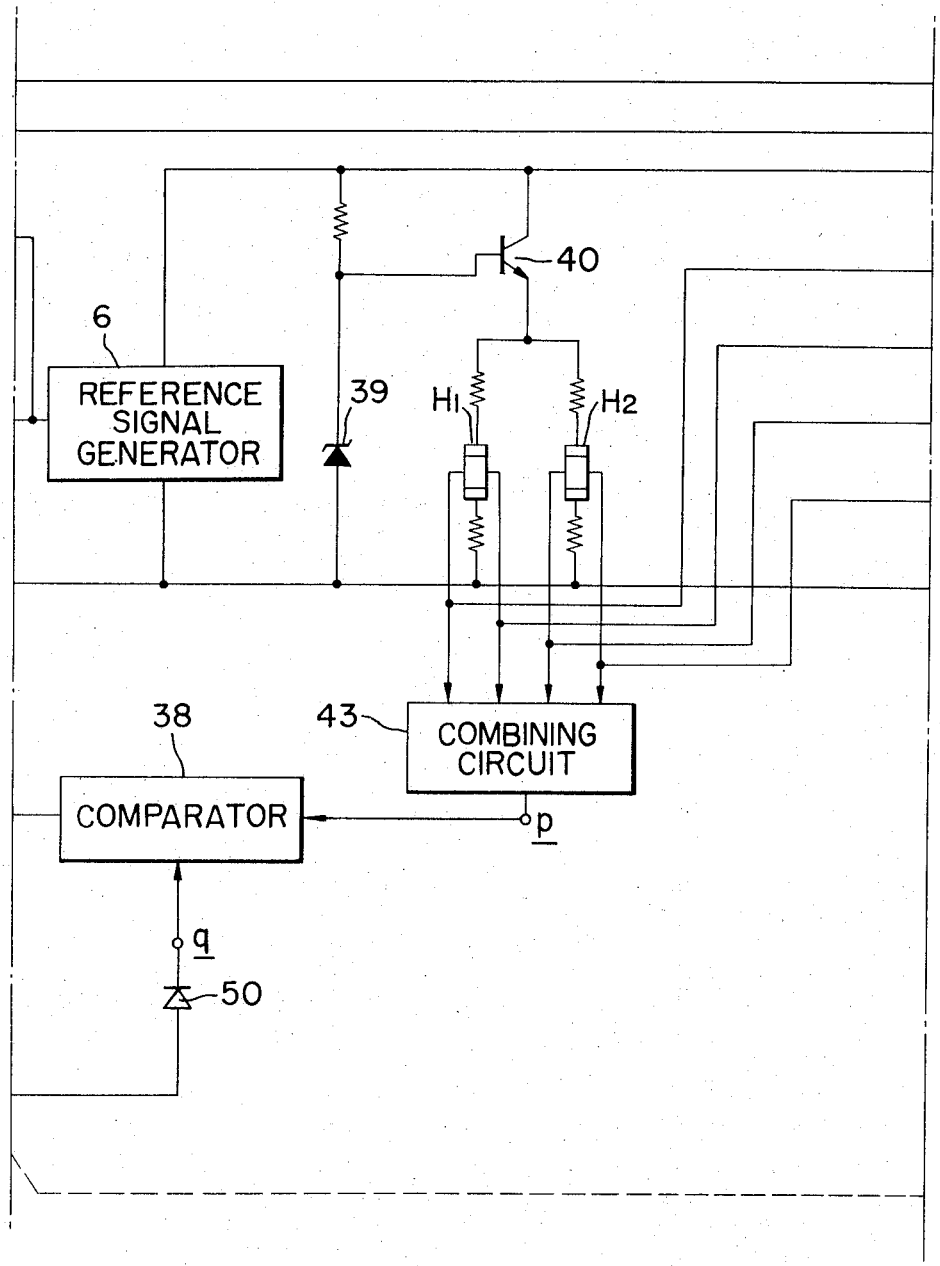

The block diagram of the embodiment shown in FIG. 12A is substantially similar in construction to that shown in FIG. 2 so that only the components which are different from or not included in the second embodiment will be described.

The output of the flip-flop 12 is applied to a switching circuit 44 to be described in detail hereinafter to control it in such a manner that it gives the output signal when and only when the output of a comparator 38 is also simultaneously applied thereto. A tacho generator 37 which detects the rotational speed of a DC brushless motor 49 is connected through a diode 50 to the input terminal $q$ of the comparator 38 and to the input terminal $b$ of the gate circuit 11 through a signal processing circuit 51 whose functions are to shape the waveform of the output signal, to differentiate and rectify it. The output voltages of the Hall generators $H_1$ and $H_2$ are added by a combining circuit 43 and applied to the other input terminal $p$ of the comparator. The output voltages of the Hall generators $H_1$ and $H_2$ are also applied to the switching circuit 44 to which is applied the output of the comparator 38, and the output terminals of the switching circuit 44 are connected to the bases of driving transistors 45–48, respectively, which supply the driving currents to the windings $L_{11}$–$L_{14}$. An on-off switch 60 is inserted for turning on or off the DC power source DCS.

The detail of the comparator 38 is shown in FIG. 12B. The differential type comparator 38 generally comprises an NPN transistor 60, PNP transistors 61 and 62, resistors 69–73 and a switch $S_2$. The output of the tacho generator 37, which is in proportion to the speed of the motor 49, is applied to the input terminal $q$ of the comparator 38 and the output of the combining circuit 43 which has a high impedance and adds the outputs of the Hall generators $H_1$ and $H_2$ is applied to the other input terminal $p$ of the comparator 38. When the motor 49 is started the output of the tacho generator 37 is zero so that the emitter potential of the transistor 60 is very low. The output of the adder 43 is applied to the base of the transistor 60 so that it is turned on and the collector potential drops. As a result the transistor 61 is conducted but the transistor 62 is turned off so that no output signal is transmitted to the switching circuit 44. The driving currents are sequentially supplied to the windings $L_{11}$–$L_{14}$ so that the speed of the motor 49 is gradually increased. As the rotational speed of the motor 49 is increased, the output voltage of the tacho generator 37 is also increased so that the emitter potential of the transistor 60 is biased in proportion to the rotational speed of the rotor R of the motor 49 to cut off the transistor 60. As a result unless the sum of the output voltages of the Hall generators $H_1$ and $H_2$ is further increased to raise the base potential, the transistor 60 is cut off so that the transistor 61 is also cut off whereas the transistor 62 is rendered conductive. The output signal of the transistor 62 is applied to the switching circuit 44 so as to start the switching action.

A constant voltage circuit comprising a zener diode 39 and a transistor 40 serves to make the average amplitude of the combined output voltage of the Hall generators $H_1$ and $H_2$ constant, and the output of the two-input comparator 38 is a pulse whose center coincides with the peak of the output of the combining circuit 43 and whose pulse width represents the amplitude of the output of the tacho generator 37. The control signals which occur at the phase angles of $\pi/2$ and multiple integrals thereof are applied to the switching circuit 44 so that the driving currents to be applied to the windings $L_{11}$–$L_{14}$ are converted into the pulses in response to the output signals from the Hall generators $H_1$ and $H_2$.

The examples of the waveforms of the driving current are shown in FIG. 13. FIG. 13(A) shows the waveform when the speed is less than a predetermined speed, the output of the tacho generator 37 is zero or extremely low and no control signal is derived from the comparator 38. FIG. 13(B) shows the waveform when the speed is slightly increased, and FIG. 13(C) the waveform when the speed becomes high. As shown in FIG. 13 the driving current pulses occur at the positions angularly spaced apart by 45° from the maximum torque positions (U and W in FIG. 10) because the control signals from the comparator 38 have the peaks at the maximum torque positions (U and W in FIG. 10) so that the outputs of the switching circuit 44 which are controlled by the control signals from the comparator 38 occurs at the positions corresponding to the maximum torque positions (U and W in FIG. 10). such driving pulse currents sequentially flow through the windings $L_{11}$–$L_{14}$ as the transistors 45–48 in the driving circuit are sequentially turned on so that the motor 49 continues the rotation. The rotational speed of the motor 49 is detected by the tacho generator 37 so that the motor 49 may rotate at a predetermined constant speed in the manner described hereinbefore. The off state of the driving current occurs at the minimum efficiency or torque position, but the driving current always flows at the maximum efficiency or torque position so that the efficiency of the motor may be remarkably improved. It should be noted that the when the motor 49 is started the driving current is not converted into the pulses as shown in FIG. 13(A) so that the large starting torque is obtained.

Figure 14A:
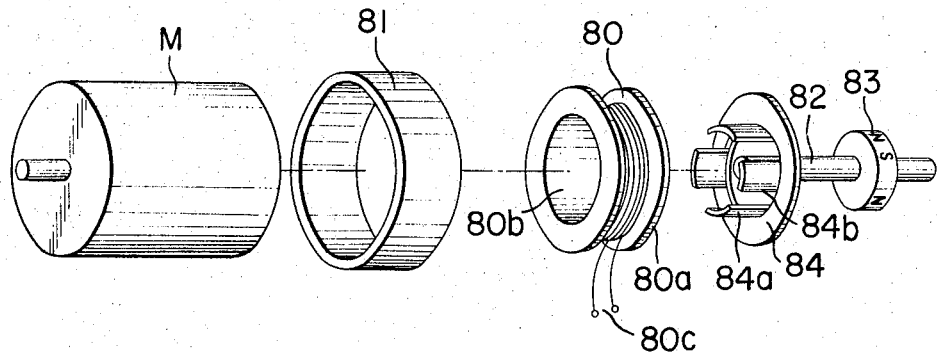
FIG. 14 shows in perspective view means for detecting the rotational speed of a DC motor used in the present invention.

In FIG. 14(A) illustrating in exploded view of an AC tacho generator, a permanent magnet 83 having pairs of opposite poles or polarities is fixed to a rotary shaft 82 of a DC motor M and is fitted into a hole 84b of a soft-iron ring 84 whose projections 84a are fitted into a hole 80b of a bobbin 80a of a winding 80. The winding 80 is fitted into a soft-iron ring 81. The AC signal voltage in proportion to the rotational speed of the shaft 82 is derived from the output terminals 80C of the winding 80.

Figure 14B:
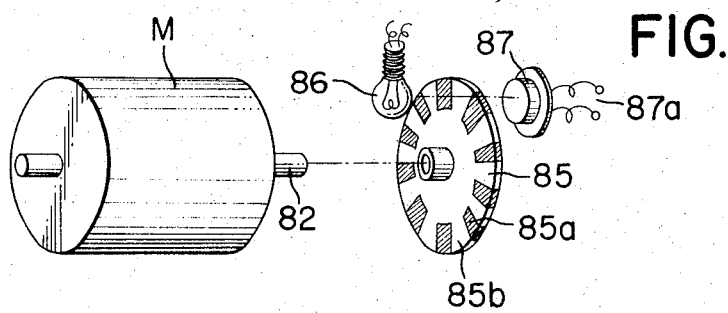

In a photoelectric type tachometer of the type shown in FIG. 14(B), an encoder 85 having a plurality of opaque portions 85a and transparent portions 85b alternately arranged is carried by the rotary shaft 82 of the motor M between a light source 86 and a photoelectric cell 87 so that the AC signal repsneting the rotational speed of the motor M is derived from the output terminals 87a of the cell 87.

Figure 14C:
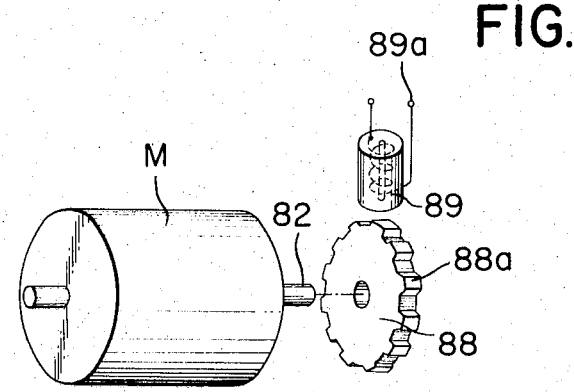

In a magnetic type tachometer of the type shown in FIG. 14(C), a disk 88 made of a magnetic material and provided with teeth 88a formed around the periphery thereof is carried by the rotary shaft 82. Alternatively the magnetic cavities are formed around the periphery of the disk 88. The change in the magnetic flux is detected by a magnetic head 89 so that the AC signal representing the rotational speed of the motor M may be derived from the output terminals 89a.

In the control systems in accordance with the present invention the above or any other conventional tachometer may be used.

According to the present invention the frequency of the reference pulses is varied in order to control the rotational speed of a DC motor, but it will be understood that the digital control is also possible. That is, the output of the reference signal or pulse generator is transferred into a counter which gives the output pulses with a suitable frequency. The counter may be modified so that the frequency of its output pulses may be varied. Furthermore when the output signals of a plurality of tacho generators are combined in a matrix circuit, the more precise control of a DC motor will become possible. It will be understood that in addition to the above modifications any modifications and variations can be effected without departing the true spirit of the present invention.

I claim:
1. A DC motor and control system therefor comprising in combination
 a. a DC motor
 b. motor-speed detecting means disposed with respect to said DC motor so as to detect the rotational speed thereof and to generate an electrical signal with a frequency representing the instantaneously changing rotational speed of said DC motor,
 c. means for generating a reference signal pulse train whose frequency is preset in order to rotate said DC motor at a predetermined constant speed, said reference signal generating means being provided independently of said motor-speed detecting means,
 d. gate circuit means for giving a logic output of said signal representative of the rotational speed and said reference signal,
 said gate circuit means being provided with input terminals to which are applied said signals representative of the rotational speed and said reference signal respectively,
 said gate circuit means passing alternately
 said signals representative of the rotational speed and said reference signals,
 e. control means for intermittently supplying a unidirectional potential to said DC motor,
 said control means being inserted between said gate circuit means and said DC motor in such a manner that the supply of potential to said DC motor is permitted in response to said reference signals whereas the supply of potential to said DC motor is interrupted in response to said signals representative of the rotational speed, and
 f. means for delaying the reference signal generated in said reference signal generating means by a predetermined time interval and for applying the delayed reference signal to said control means to control the supply of potential to said DC motor,
2. A DC motor and control system therefore as defined in claim 1 wherein said DC motor comprises a. a rotor having magnetic poles of opposite polaries thereon,
b. a stator having flux-producing windings positioned in torque-producing relation to said rotor, and
c. Hall generators positioned in flux sensing relation to said magnetic poles.

3. A DC motor and control system therefore as defined in claim 2 wherein said means for detecting the rotational speed of said DC motor comprises
electrical signal processing means for detecting the AC signals induced by said Hall generators and shaping them into the trigger pulse signal to be applied to said gate circuit means.

4. A DC motor and control system therefore as defined in claim 2 wherein said means for detecting the rotational speed of said DC motor comprises
electrical signal processing means for detecting the AC signals induced across said flux-producing windings on said stator and shaping them into the trigger pulse signals to be applied to said gate circuit means.

5. A DC motor and control system therefore as defined in claim 2 wherein
said means for detecting the rotational speed of said DC motor comprises
an AC tacho generator,
rectifier means for rectifying the AC output of said AC tacho generator into the rectangular waveform signal,
differentiator means for differentiating said rectangular waveform signal, and
rectifier means for rectifying the output of said differentiator means and applying the rectified output signal to said gate circuit means.

6. A DC motor and control system therefore as defined in claim 1 wherein
said reference signal (pulse) generating means comprises
means for dividing the frequency of said reference signals for changing a synchronous speed of said DC motor.

7. A DC motor and control system therefore as defined in claim 6 wherein
said reference signal generating means further comprises
differentiator means for differentiating the output of said frequency dividing means, and means for rectifying the output of said differentiator means and applying the rectified output to said gate circuit means.

8. A DC motor and control system therefore as defined in claim 1 wherein
said control means comprises flip-flop means which is set in response to said reference signal and is reset in response to said signal representative of the rotational speed of said DC motor.

9. A DC motor and control system therefore as defined in claim 1 wherein, to said reference signal delaying means is connected a control circuit for controlling said reference signal delaying means to hold the latter during a predetermined time interval after the DC Motor is started.

10. A DC motor and control system therefor comprising in combination
a. A DC motor comprising
a rotor having magnetic poles of opposite polarities thereon,
stator windings, and Hall generators positioned in flux-sensing relation to said magnetic poles,
b. means positioned with respect to the rotor of said DC motor so as to detect the instantaneous rotational speed thereof and to generate electrical signals representative of said instantaneous rotational speed,
c. external reference signal generating means disposed independently of said means for detecting the instantaneous rotational speed of said DC motor for generating external reference signals with a predetermined frequency,
d. gate circuit means for giving a logic output of said reference signals and said signals for representing the instantaneous rotational speed of said DC motor,
said gate circuit means being provided with input terminals to which are applied said reference signals and said signals representative of the instantaneous rotational speed of said DC motor, respectively,
said gate circuit means generating a control signal for permitting the power supply to said DC motor in response to said reference signals and the signal for interrupting the power supply to said DC motor in response to said signals representative of the instantaneous rotational speed of said DC motor,
said two control signals being alternately generated, e. flip-flop means inserted between said gate circuit means and said Hall generators, said flip-flop means being set in response to the output signal of said gate circuit means which in turn is derived in response to said reference signal and is reset in response to the output signal of said gate circuit means which in turn is derived in response to said signal representative of the instantaneous speed of said DC motor, thereby controlling the supply of the voltage to be applied across said Hall generators, and
f. means for delaying the reference signal generated in said reference signal generating means by a predetermined time interval and applying the delayed reference signal to said flip-flop means to reset the latter.

11. A DC motor and control system therefor comprising in combination
a. a DC motor,
b. means for generating an AC signal whose frequency is in proportion to the rotational speed of said DC motor,
c. reference signal generating means disposed independently of said means for generating the AC signal representative of the rotational speed of said DC motor for generating a reference signal with a predetermined frequency,
d. flip-flop means operatively coupled to said DC motor so that the DC power supply to said DC motor may be intermittently interrupted,
e. gate circuit means comprising a logic circuit for alternately setting and resetting said flip-flop means, said logic circuit being provided with input terminals to which are applied the outputs of said speed signal generating means and of said reference signal generating means and with output terminals from which two output signals are alternately applied to said flip-flop means, and f. means for delaying the reference signal generated in said reference signal generating means by a predetermined time interval and applying the delayed reference signal to said flip-flop means to reset the latter.

12. A DC motor and control system therefore as defined in claim 11 wherein said speed signal generating means comprises
an AC tacho generator comprising
a magnetic member rotatable in unison with the rotary shaft of said DC motor and having magnetic poles of opposite polarities.
a pair of stationary soft-iron magnetic members, and
a coil mounted between said magnetic members.

13. A DC motor and control system therefore as defined in claim 11 wherein said speed signal generating means comprises
optical speed detecting means comprising a member rotatable in unison with the rotary shaft of said DC motor and having transparent and opaque portions alternately arranged thereon, and light source means and a photoelectric cell so disposed that said member is interposed therebetween.

14. A DC motor and control system therefore as defined in claim 11 wherein said speed signal generating means comprises
magnetic speed detecting means comprising a member rotatable in unison with the rotary shaft of said DC motor and having magnetic signal means disposed in angularly spaced apart relation with each other, and a magnetoelectric transducer disposed in opposed relation with said magnetic signal means.

15. A DC motor and control system therefore as defined in claim 11 wherein said phase shifting means is operatively coupled to a control circuit to control the actuation of said phase shifting means, and said control circuit is actuated as soon as said DC motor is started and couples said phase shifting means to a DC power source a predetermined time after said DC motor is started.

16. A DC motor and control system therefor comprising in combination
a DC motor comprising
a rotor having magnetic poles of opposite polarities thereon,
stator windings, and Hall generators positioned in flux sensing relation to said magnetic poles,
b. means disposed with respect to said rotor of said DC motor so as to detect the instantaneous rotational speed of said rotor and to generate electrical signals whose frequency represents the instantaneous rotational speed of said DC motor,
c. means disposed independently of said means for generating the signals representative of the instantaneous speed of said DC motor for generating external reference signals with a predetermined frequency,
d. gate circuit means for giving a logic output of said instantaneous speed signals and said reference signals,
said gate circuit means alternately generating a signal for controlling the supply of the power to said Hall generators in response to the signal from said instantaneous rotational speed detecting, and a signal for interrupting the power supply to said Hall generators in response to said reference signal,
e. means for delaying the reference signal by a predetermined time interval,
f. comparator means for comparing the output of said Hall generators with the output signal of said instantaneous rotational speed detecting means, and g. signal switching means inserted between said Hall generators and said stator windings for controlling the supply of the power to said windings and the interruption thereof in response to the output signal from said comparator means and by the help of the output signals of said gate circuit means, thereby improving the efficiency of said DC motor.

* * * * *

UNITED STATES PATENT OFFICE
CERTIFICATE OF CORRECTION

Patent No. 3,831,073                    Dated August 20, 1974

Inventor(s)    KINJI TANIKOSHI

It is certified that error appears in the above-identified patent and that said Letters Patent are hereby corrected as shown below:

Column 1, line 9, "syncrhonous" should read --synchronous--;

Column 1, line 37, "motors," should read --motors.--;

Column 1, line 43, "hish" should read --high--;

Column 2, line 46, "in a manner than when" should read --in such a manner that when--;

Column 9, last line, to Column 10, line 8, delete "When......of the flip-flop 12";

Column 13, line 63, "represneting" should read --representing--;

Signed and sealed this 3rd day of December 1974.

(SEAL)
Attest:

McCOY M. GIBSON JR.
Attesting Officer

C. MARSHALL DANN
Commissioner of Patents